US010229570B2

(12) United States Patent
Gill et al.

(10) Patent No.: US 10,229,570 B2
(45) Date of Patent: Mar. 12, 2019

(54) TECHNOLOGIES FOR PHYSICAL ASSAULT DETECTION USING SECURE CLOTHING AND/OR CLOTHING ACCESSORIES

(71) Applicant: Intel Corporation, Santa Clara, CA (US)

(72) Inventors: Balkaran Gill, Cornelius, OR (US); Suraj Sindia, Hillsboro, OR (US); Zhen Yao, San Jose, CA (US); Mariano Phielipp, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/394,014

(22) Filed: Dec. 29, 2016

(65) Prior Publication Data

US 2018/0190094 A1 Jul. 5, 2018

(51) Int. Cl.
| | |
|---|---|
| G08B 23/00 | (2006.01) |
| G08B 21/02 | (2006.01) |
| G08B 25/01 | (2006.01) |
| A41D 1/00 | (2018.01) |
| G01L 5/00 | (2006.01) |
| G06N 3/08 | (2006.01) |

(52) U.S. Cl.
CPC ............ *G08B 21/02* (2013.01); *A41D 1/002* (2013.01); *G01L 5/00* (2013.01); *G06N 3/08* (2013.01); *G08B 25/016* (2013.01)

(58) Field of Classification Search
CPC .......................... A61M 16/0833; A41D 1/002
USPC ....................................................... 340/573.1
See application file for complete search history.

(56) References Cited

U.S. PATENT DOCUMENTS

| | | | | |
|---|---|---|---|---|
| 5,584,291 | A * | 12/1996 | Vapola ................ | A61M 16/104 128/925 |
| 2009/0235761 | A1 * | 9/2009 | Song .................... | A63B 69/004 73/862.59 |
| 2010/0148975 | A1 * | 6/2010 | Riley ................. | G08B 21/0297 340/665 |
| 2014/0182038 | A1 * | 7/2014 | Hirsch ...................... | F41H 1/02 2/2.5 |
| 2015/0138699 | A1 * | 5/2015 | Yamazaki ............... | G06F 1/163 361/679.03 |
| 2017/0092098 | A1 * | 3/2017 | Alampallam .......... | G08B 21/18 |

* cited by examiner

*Primary Examiner* — Fabricio R Murillo Garcia
(74) *Attorney, Agent, or Firm* — Barnes & Thornburg LLP

(57) ABSTRACT

Technologies for detecting a physical assault against a user include one or more clothing sensor modules coupled to a garment of the user. Each clothing sensor module is configured to produce sensor data indicative of the removal of the garment from the user and determine whether a physical assault is presently occurring against the user using an assault detection model with the sensor data as an input to the assault detection model. In response to a determination of the physical assault against the user, the clothing sensor module is configured to alert a trust party.

22 Claims, 8 Drawing Sheets

US 10,229,570 B2

TECHNOLOGIES FOR PHYSICAL ASSAULT DETECTION USING SECURE CLOTHING AND/OR CLOTHING ACCESSORIES

BACKGROUND

Sexual assaults and other forms of violent attacks have been major concerns for public safety and perceived safety throughout the world due to the sporadic nature of such attacks. Physical assaults leave the public, in even relatively safe neighborhoods, with a perceived sense of vulnerability. Although recent advancements, such as personal mobile phones, have provided some means for a victim to contact authorities for help, such solutions are not always available. For example, a victim's personal mobile phone may not be readily available to the victim when needed.

Neural networks are a class of learning algorithms, which may be embodied as hardware and/or software, that emulate higher-order brain functions such as memory, learning, and/or perception/recognition. Such networks are configured to adopt a parallel approach to problem solving in which pattern recognition and mapping problems can be solved in thousandths of the time required by a conventional Von-Neuman computer with its single-instruction cycle times.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
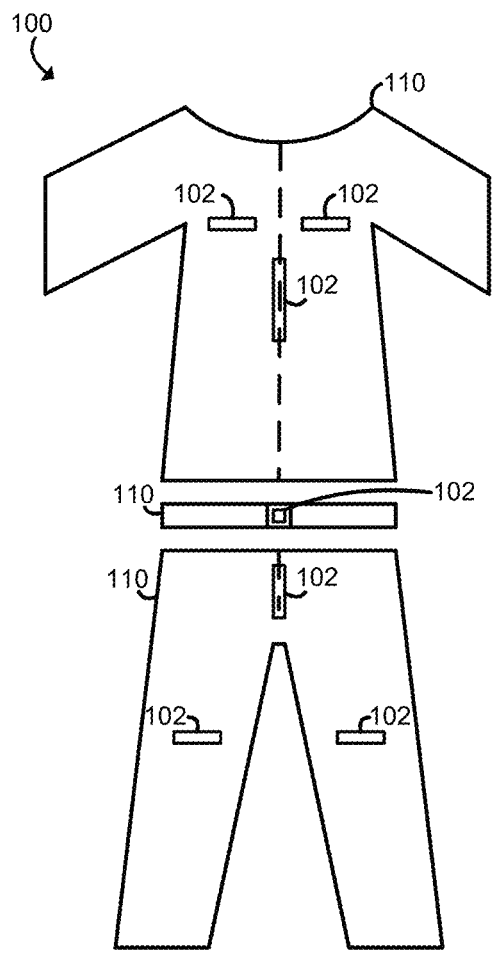
FIG. 1 is a simplified illustration of a plurality of garments of a user having a plurality of clothing sensor modules attached thereto.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a garment outfit 100 includes one or more garments 110 wearable by the user and configured to detect a physical assault against the user. To do so, each garment 110 includes one or more clothing sensor modules 102 coupled to the garment 110. The garment 110 may be embodied as any type of clothing or wearable accessory such as, for example, a shirt, a belt, a pair of pants, a pair of shorts, a skirt, an undergarment, a jacket, a pair of shoes, or other types of clothing or clothing accessory. In the illustrative embodiments, the clothing sensor module 102 may be embedded in or attachable and detachable to the garment 110 at various erogenous zones, such as a chest region, a buttocks region, a pelvis region, a waist region, a knee region, or other regions vulnerable to a physical attack, such as a sexual physical assault. For example, the clothing sensor module 102 may be embedded along a zipper or waist lines of a pair of pants, along the buttons of a shirt, and/or around a clasp or a buckle of the belt within the erogenous zones of the garment 110 to detect a physical assault against the user. In use, the clothing sensor module 102 is configured to detect a forcible removable of the secured garment 110 and transmit an alert notification to the trusted third-party in response to the determination that the physical assault is occurring against the user. It should be appreciated that the clothing sensor module 102 may also be used to transmit an alert notification to the trusted third-party in response to a determination of a physical collision or accident, for example, a car accident in some embodiments.

Figure 2:
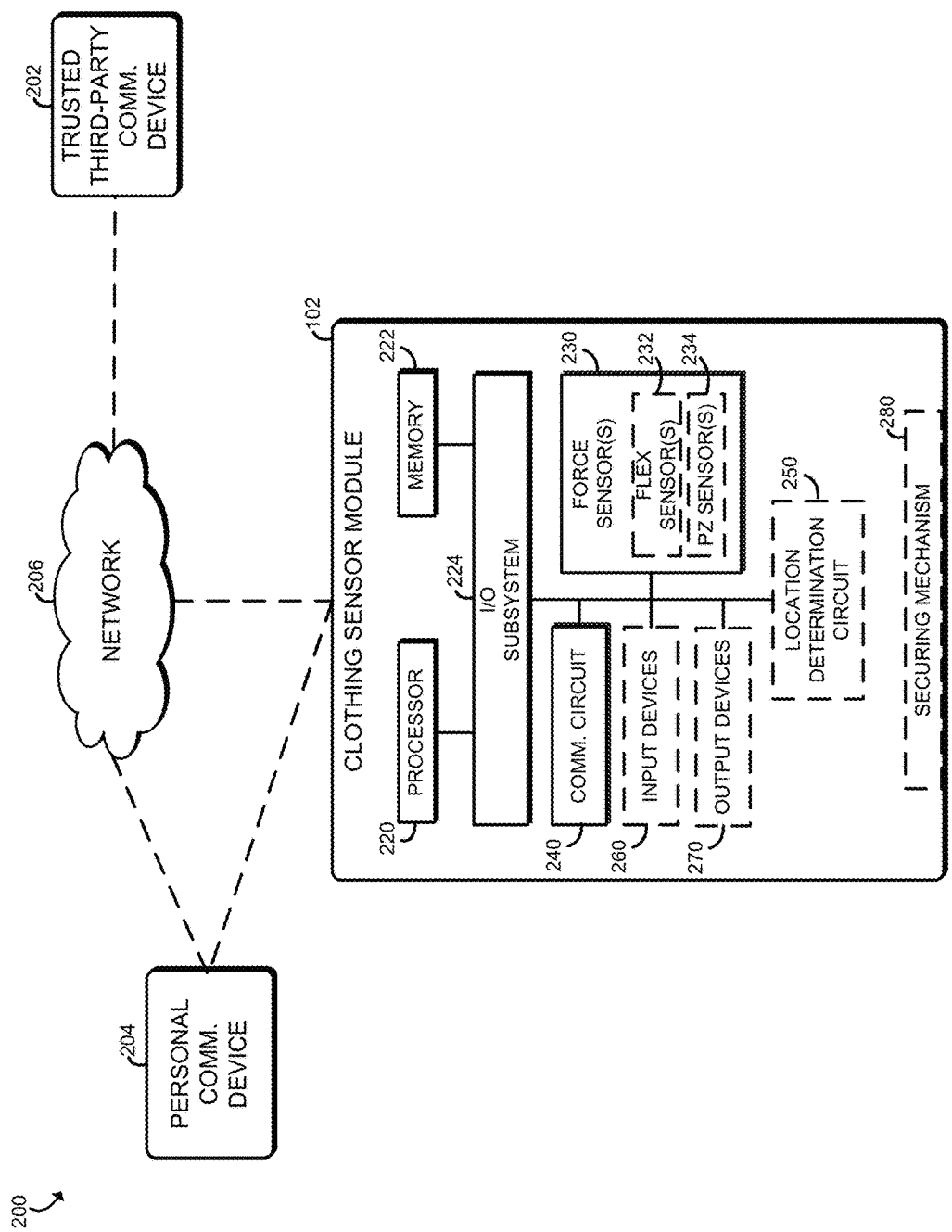
FIG. 2 is a simplified block diagram of at least one embodiment of a clothing sensor module for detection of a physical assault against the user.

Referring to FIG. 2, a system 200 for detecting a physical assault against a user of secured clothing includes a clothing sensor module 102, a trusted third-party communication device 202, and a personal communication device 204. As discussed above, the clothing sensor module 102 may be embedded in a garment worn by the user or otherwise secured to the garment via a clasp or other securing mechanism. Additionally, as discussed in more detail below, the clothing sensor module 102 is configured to detect a physical assault against the user of the garment 110 and transmit an alert notification to the trusted third-party communication device 202 over the network 206 in response to a determination the physical assault is occurring. To do so, the clothing sensor module 102 may transmit an alert notification directly to the trusted third-party communication device 202, or indirectly to the trusted third-party communication device 202 through the personal communication device 204 of the user, depending on the capability of the clothing sensor module 102 to connect to the available network 206.

The clothing sensor module 102 may be embodied as any type of computation or compute device capable of being embedded in or otherwise attachable and detachable to a garment 110 of the user and performing the functions described herein. For example, the clothing sensor may be embodied as, without limitation, a wearable compute device, a system-on-a-chip, an embedded system, a distributed compute device, a smart device, a mobile compute device, and/or other compute device. As shown in FIG. 2, the illustrative clothing sensor module 102 includes a processor 220, a memory 222, an input/output ("I/O") subsystem 224, one or more force sensors 230, and a communication circuit 240. Additionally, in some embodiments, the clothing sensor module 102 may include a location determination circuit 250, one or more input devices 260, and/or one or more output devices 270. Of course, the clothing sensor module 102 may include other or additional components, such as those commonly found in a typical compute device (e.g., various input/output devices and/or other components), in other embodiments. Additionally, in some embodiments, one or more of the illustrative components may be incorporated in, or otherwise form a portion of, another component. For example, the memory 222, or portions thereof, may be incorporated in the processor 220 in some embodiments.

The processor 220 may be embodied as any type of processor capable of performing the functions described herein. For example, the processor 220 may be embodied as a single or multi-core processor(s), digital signal processor, microcontroller, or other processor or processing/controlling circuit. Similarly, the memory 222 may be embodied as any type of volatile or non-volatile memory or data storage capable of performing the functions described herein. In operation, the memory 222 may store various data and software used during operation of the clothing sensor module 102 such as applications, programs, libraries, and drivers. The memory 222 is communicatively coupled to the processor 220 via the I/O subsystem 224, which may be embodied as circuitry and/or components to facilitate input/output operations with the processor 220, the memory 222, and other components of the clothing sensor module 102. For example, the I/O subsystem 224 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 224 may form a portion of a system-on-a-chip (SoC) and be incorporated, along with the processor 220, the memory 222, and other components of the clothing sensor module 102, on a single integrated circuit chip.

The force sensor(s) 230 may be embodied as any type of sensor capable of producing sensor data indicative of the removal of an associated garment 110 from a user. For example, in the illustrative embodiment, the force sensor(s) 230 may be embodied as, or otherwise include, one or more flex sensors 232 and/or one or more piezo-electric (PZ) sensors 234. Each of the flex sensors 232 and the piezo-electric sensors 234 are configured to produce sensor data indicative of whether force has been applied to the garment 110 by detecting the deflection or deformation of the garment 110. Of course, in other embodiments, other types of force sensors may be used.

The communication circuit 240 may be embodied as any type of communication circuit, device, or collection thereof, capable of enabling communications between the clothing sensor module 102 and the trusted third-party communication device 202 and/or the personal communication device 204. To do so, the communication circuit 240 may be configured to use any one or more communication technologies (e.g., wireless or wired communications) and associated protocols (e.g., Ethernet, Bluetooth®, Wi-Fi®, WiMAX, LTE, 4G, 5G, etc.) to effect such communication. In use, as discussed in more detail below, the communication circuit 240 is configured to transmit an alert notification to the trusted third-party communication device 202. Depending on the type of the communication circuit 240, the clothing sensor module 102 may transmit the alert notification directly to the trusted third-party communication device 202 or indirectly to the trusted third-party communication device 202 through the personal communication device 204.

In some embodiments, the clothing sensor module 102 may include a location determination circuit 250. The location determination circuit 250 may be embodied as any type of circuit or device capable of determining a location of the clothing sensor module 102 or otherwise producing data indicative of such a location. For example, in some embodiments, the location determination circuit 250 may be embodied as a Global Positioning System (GPS) circuit. As discussed in more detail below, the clothing sensor module 102 may transmit an alert notification to the third-party communication device 202, via the communication circuit 240, which may include the location of the clothing sensor module 102 as determined by the location determination circuit 250. Alternatively, in other embodiments, the GPS location of the clothing sensor module 102 (i.e., of the user) may be determined by the user's personal communication device 204 and transmitted to the trusted third-party communication device 202.

The clothing sensor module 102 may also include one or more input devices 260 in some embodiments. The input devices 260 may be embodied as any type of device, circuit, or component capable of receiving input from the user of the clothing sensor module 102. For example, the input devices 260 may include an audio sensor (e.g., a microphone), a camera, a physical or visual input button(s), touch sensors (e.g., capacitive or resistive touch sensors, force sensors, or other touch sensors), motion sensors (e.g., accelerometers and/or gyroscopes), or other input devices. For example, in some embodiments, the input devices 260 may include an audio sensor configured to capture voice commands from a user, and may also capture background noise. Additionally or alternatively, the input devices 260 may include a camera configured to capture still images and/or video images of an environment surrounding the user and/or possibly an attacker(s). In such embodiments, the clothing sensor module 102 may be configured to transmit the captured audio, image, and/or video to the third-party communication device 202 as part of the alert notification, as discussed below.

The output devices 270 may be embodied as any type of device, circuit, or component capable of generating output on the clothing sensor module 102. For example, the output devices 270 may be embodied as, or otherwise include, a display, a speaker or other audio output device (e.g., a siren), one or more visible lights and/or IR LEDS, and/or other output devices. The output devices 270 may send out a local alarm (e.g., display, sound, or light) in response to a determination that a physical assault is presently occurring against the user. For example, in some embodiments, the output devices 270 may include a display to provide information to the user of the clothing sensor module 102 during operation. In such embodiments, the display may be embodied as any type of display capable of displaying digital information such as a liquid crystal display (LCD), a light emitting diode (LED) display, an organic light emitting diode (OLED) display, a plasma display, a cathode ray tube (CRT), or other type of display device. Of course, the clothing sensor module 102 may also include any number of additional input/output devices, interface devices, and/or other peripheral devices. For example, in some embodiments, the peripheral devices may include a touch screen, graphics circuitry, keyboard, network interface, and/or other input/output devices, interface devices, and/or peripheral devices.

As discussed above, the clothing sensor module 102 may be embedded in a garment 110 of the user in some embodiments. In other embodiments, the clothing sensor module 102 may be configured to be attachable and detachable to the garment 110, such that the clothing sensor module 102 may be attached to different garments 110 of the user at different times. In such embodiments, the clothing sensor module 102 includes the securing mechanism 280 to secure the clothing sensor module 102 to the garment 110. The securing mechanism 280 may be embodied as any type of attachment mechanism capable of coupling the clothing sensor module 102 to the garment 110. For example, the securing mechanism 280 may be embodied as a clip, a pin, latch, clasp, button, or other device capable of attaching or securing the clothing sensor module 102 to the user's garment 110.

The trusted third-party communication device 202 may be embodied as any type of communication device capable of receiving communications from the clothing sensor module 102 and/or the personal communication device 204. For example, the trusted third-party communication device 202 may be embodied as a cellular phone, a mobile computing device, a computer, a server, a computation device, a networked device, a distributed compute system, or other device capable of receiving communications from the clothing sensor module 102 and/or the personal communication device 204. As such, the trusted third-party communication device 202 may include components typically found in a communication device such as a processor, memory, I/O subsystem, communication circuit, input device, and/or output devices. The description of such components is similar to the corresponding components of the clothing sensor module 102 and is not repeated herein for clarity of the description.

The trusted third-party communication device 202 is managed by a trusted third-party. In some embodiments, the trusted third-party may be a first-responder agency (e.g., police, fire, ambulance). Alternatively, in other embodiments, the trusted third-party may be an acquaintance, such as a family member, a guardian, or a friend. As discussed above, the trusted third-party communication device 202 is configured to receive the alert notification transmitted by the clothing sensor module 102 when the clothing sensor module 102 detects a physical assault against the user. In the illustrative embodiment, the alert notification may be embodied as a text alert notification, which may include a GPS location of the clothing sensor module 102. In some embodiment, the GPS location of the clothing sensor module 102 may be determined by the location determination circuit 250 of the clothing sensor module 102. Alternatively, in other embodiments, the GPS location of the clothing sensor module 102 may be determined by the user's personal communication device 204 and transmitted to the trusted third-party communication device 202. For example, in some embodiments, the alert notification includes the GPS location of the user's personal communication device 204. Further, it should be appreciated that, in some embodiments, the alert notification may include an audio, an image, and/or a video captured by an input device 260 of the clothing sensor module 102.

The personal communication device 204 may be embodied as any type of communication device capable of receiving communications from the clothing sensor module 102 and communicating with the trusted third-party communication device 202 over the network 206. For example, the personal communication device 204 may be embodied as a cellular phone, a mobile computing device, a tablet computer, a laptop computer, or other mobile communication device. As such, the personal communication device 204 may include components typically found in a communication device such as a processor, memory, I/O subsystem, communication circuit, input device, and/or output devices. The description of such components is similar to the corresponding components of the clothing sensor module 102 and is not repeated herein for clarity of the description.

As discussed above, the clothing sensor module 102 may communicate directly with the trusted third-party communication device 202 over the network 206 or via the personal communication device 204 of the user (e.g., via a local BLUETOOTH® connection, a personal area network (PAN), or the like). The network 206 may be embodied as any type of network capable of facilitating communications between the clothing sensor module 102 and the trusted third-party communication device 202 and/or between the personal communication device 204 and the trusted third-party communication device 202. For example, the network 206 may be embodied as, or otherwise include, a cellular network, wireless local area network (LAN), a wireless wide area network (WAN), and/or a publicly-accessible, global network such as the Internet. As such, the network 206 may include any number of additional devices, such as additional computers, routers, and switches, to facilitate communications thereacross.

Figure 3:
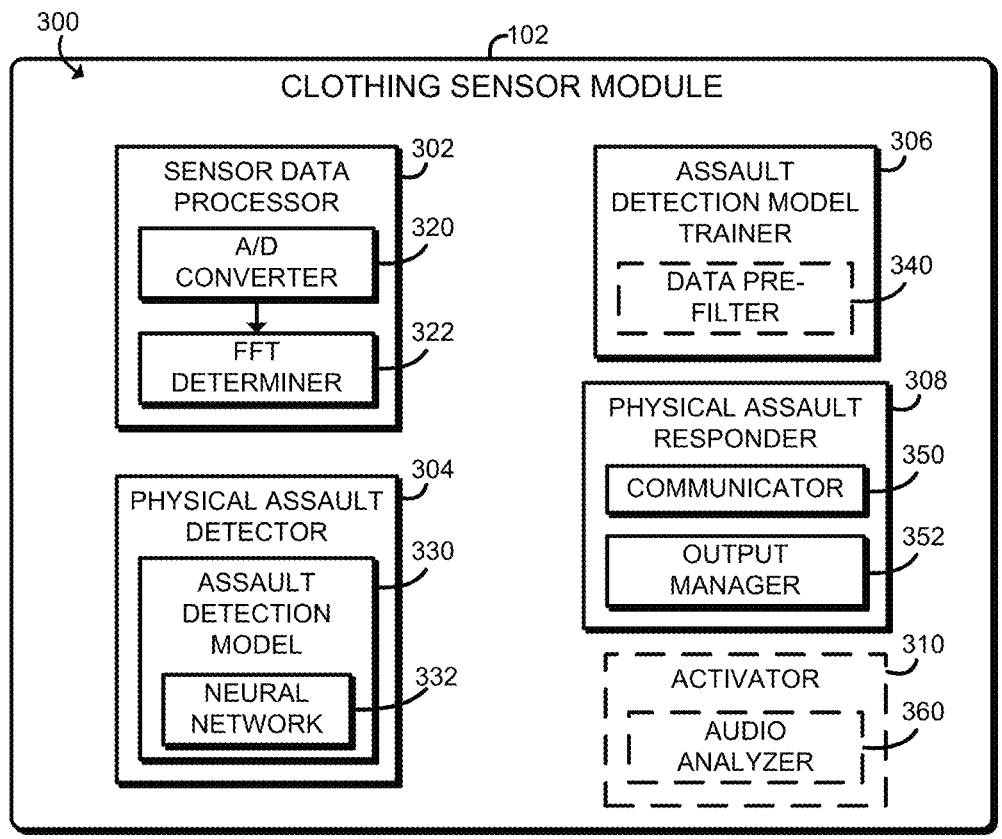
FIG. 3 is a simplified block diagram of at least one embodiment of an environment that may be established by the clothing sensor module of FIG. 2.

Referring to FIG. 3, in use, the clothing sensor module 102 may establish an environment 300. The illustrative environment 300 includes a sensor data processor 302, a physical assault detector 304, an assault detection model trainer 306, a physical assault responder 308, and, in some embodiments, an activator 310. The various components of the environment 300 may be embodied as hardware, firmware, software, or a combination thereof. As such, in some embodiments, one or more of the components of the environment 300 may be embodied as circuitry or collection of electrical devices (e.g., a sensor data processor circuit 302, a physical assault detector circuit 304, an assault detection model trainer circuit 306, a physical assault responder circuit 308, an activator circuit 310, etc.). It should be appreciated that, in such embodiments, one or more of the sensor data processor circuit 302, the physical assault detector circuit 304, the assault detection model trainer circuit 306, the physical assault responder circuit 308, and/or the activator circuit 310 may form a portion of one or more of the processor 220, the I/O subsystem 224, the communication circuit 240, and/or other components of the clothing sensor module 102. Additionally, in some embodiments, one or more of the illustrative components of the environment 300 may form a portion of another component and/or one or more of the illustrative components may be independent of one another. Further, in some embodiments, one or more of the components of the environment 300 may be embodied as virtualized hardware components or emulated architecture, which may be established and maintained by the processor 220 or other components of the clothing sensor module 102.

The sensor data processor 302 is configured to process the sensor data received from the force sensor(s) 230 to prepare the received sensor data for analysis by the physical assault detector 304. To do so, in the illustrative embodiment, the sensor data processor 302 includes an analog-to-digital (A/D) converter 320 and a fast Fourier transform (FFT) determiner 322. The sensor data processor 302 processes electrical signals (e.g., voltage signals) received from the force sensor(s) 230 using the AD converter 320 for discretization and quantization of the signals. The FFT determiner 322 further processes the processed signals to generate FFT coefficients. As discussed below, the FFT coefficients may be analyzed by the physical assault detector 304 to determine whether a physical assault is occurring against the user using an assault detection model 330.

The physical assault detector 304 is configured to detect whether a physical assault, such as a sexual assault, is occurring against the user based on the sensor data (e.g., based on the FFT coefficients determined by the FFT determiner 322). To do so, the physical assault detector 304 includes an assault detection model 330 that is trained to determine whether the received sensor data sample indicates a physical assault. The assault detection model 330 may be embodied as any type of mathematical algorithm or equation capable of producing an output indicative of whether the associated garment 110 is being forcibly or undesirably removed from the user using the sensor data from the force sensor(s) 230, which have been pre-processed by the sensor data processor 302, as input to the model, algorithm, or equation. For example, in the illustrative embodiment, the assault detection model 330 is embodied as a neural network 332. The neural network 332 may exhibit an internal memory and is capable of remembering previous sensor data and corresponding classification. As discussed in detail below, the neural network 332 may be updated or modified over time to eliminate false positives in predicting the physical assault against the user wearing the garment 110.

The assault detection model trainer 306 is configured to train the assault detection model 330 such that the corresponding clothing sensor module 102 is trained or customized to the every-day normal behavior of the user. To do so, the user may perform various training stages to train the clothing sensor module 102 (i.e., to train the assault detection model 330). During those training stages, as discussed in more detail below, the assault detection model trainer 306 collects sensor data samples of the sensor data during normal activity of the user while wearing the garment 110. Such sensor data samples received during the normal activity of the user are presumed to be benign data samples, which are indicative of a benign interaction with the garment 110. The sensor data samples are used to initially train the assault detection model 330 using those data samples as known benign samples. In a subsequent training phase, the assault detection model trainer 306 again collects sensor data samples of the sensor data during normal activity of the user while wearing the garment 110, which are subsequently classified by the trained assault detection model 330 as begin or malicious. As such, if the sensor data sample is identified as malicious, the clothing sensor module 102 may present the malicious data sample to the user for scoring a false positive during that training phase. In this way, the false positive rate of classification by the clothing sensor module 102 is reduced through user-guided opportunistic learning of normal benign interactions.

In the illustrative embodiment, the assault detection model trainer 306 may include a data pre-filter 340. The data pre-filter 340 is configured to pre-filter the scored data samples to reduce a size of the scored data samples to efficiently process the sensor data. Once the user has scored the sensor data samples in the corresponding training phase, the data pre-filter 340 may segment the scored data samples into a number of sample segments and select a sample segment in turn. For each selected sample segment, the data pre-filter 340 may train a learning algorithm using the corresponding non-selected sample segments as inputs to the learning algorithm. In addition, the data pre-filter 340 may classify each of the selected sample segment using the learning algorithm as either benign or malicious. If the classification and the user scoring of the selected sample segment do not match, the data pre-filter 340 discards the selected sample segment. The remaining scored samples are then used to further train the assault detection model 330.

The physical assault responder 308 is configured to perform an alert action in response to a determination by the physical assault detector 304 that a physical assault is presently occurring against the user. To do so, the physical assault responder 308 includes a communicator 350 and an output manager 352. The communicator 350 is configured to transmit an alert notification to a trusted third-party communication device 202 in response to a determination of a physical assault against the user. As discussed above, in some embodiments, the communicator 350 may be configured to transmit the alert notification to the personal communication device 204 in order to relay the alert notification to the trusted third-party communication device 202. Additionally, in some embodiments, the physical assault responder 308 may contemporaneously activate an output device 270 of the clothing sensor module 102 to generate a local alert. The local alert may be an audible or visual alert. For example, the output manager 352 may activate a siren or a flashing light of the clothing sensor module 102 in response to a determination of a physical assault against the user.

As discussed above, the environment 300 of the clothing sensor module 102 may also include an activator 310. The activator 310 is configured to activate the monitoring of the force sensor data produced by the force sensor(s) 230 by the clothing sensor module 102 in response to receipt of a user activation command. That is, in a sense, the activator 310 may "turn on" the clothing sensor module 102 in response to detection of the activation command. The activation command may be embodied as any type of user command capable of being detected by the clothing sensor module 102 via one or more of the input devices 260. For example, the activation command may be embodied as the pushing of a button, the tapping of the clothing sensor module 102, or any other user gesture that can be detected by the clothing sensor module 102. In the illustrative embodiment, the activator 310 includes an audio analyzer 360. In such embodiments, the audio analyzer 360 is configured to analyze voice data collected by an audio sensor of the input devices 260. For example, the audio analyzer 360 may analyze the voice data to determine the use's voice activation command, such as "HELP," "HELP ME," "SAVE ME," "THREATS HERE," "CALL 911," or other voice activation command indicated by the user. In response to a determination of the activation command or the voice activation command, the activator 310 initiates the monitoring and analyses of the sensor data form the force sensor(s) 230. In some embodiments, the activator 310 may immediately trigger the physical assault responder 308 to transmit the alert action in response to the activation command, regardless of the sensor data analysis. Additionally, in some embodiments, the activator 310 may activate audio device (e.g., microphone) to capture the background sound and/or a camera to capture still images or video (e.g., of the attacker(s)) in response to a determination of the activation command or the voice activation command.

Figure 4:
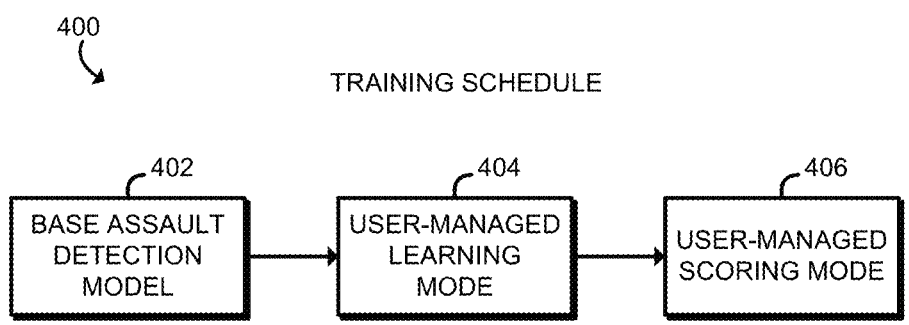
FIG. 4 is a simplified block diagram of an illustrative training schedule of the clothing sensor module of FIGS. 2 and 3.

Referring to FIG. 4, an illustrative training schedule 400 for training the clothing sensor module 102 includes a base assault detection model 402, a user-managed learning mode 404, and a user-managed scoring mode 406. The base assault detection model 402 represents an initial base line of classification for the assault detection model 330 (e.g., the neural network 332), which may be provided by a manufacturer of the clothing sensor module 102. To do so, the manufacturer may conduct an initial training to provide an initial base line of classification, which may be used to initially analyze the sensor data produced by the force sensor(s) 230. For example, in embodiments wherein the clothing sensor module 102 is embedded in the garment 110, a manufacture of the garment 110 may conduct a training to provide the initial base line of classification for a specific type of the garment 110. It should be appreciated that the initial base line may be different depending on the type of the garment 110 and/or the intended wearer. In some embodiments, the base assault detection model 402 may be provided by a third party provider.

After the user has acquired the clothing sensor module 102, the clothing sensor module 102 is further trained based on the user's typical movements in a user-managed learning mode 404 phase. During the user-managed learning mode 404, the clothing sensor module 102 is configured to collect sensor data based on normal every-day behavior of the user, such as while the user is walking, running, standing, sleeping, and sitting. The data collected during the user-managed learning mode 404 is presumed to be benign, and the assault detection model 330 is trained using the collected sensor data indicative of those benign interactions.

Subsequent to the user-managed learning mode 404, the assault detection model 330 may be further trained for classifying between benign interactions and malicious interactions using the user-managed scoring mode 406. During the user-managed scoring mode 406, the clothing sensor module 102 collects additional sensor data based on normal every-day behavior of the user. The clothing sensor module 102 is configured to classify each sensor data sample of the collected sensor data as a benign data sample or a malicious data sample using the assault detection model 330 trained in the user-managed learning mode 404. As discussed above, the benign data sample indicates a benign interaction with the garment 110, whereas, the malicious data sample indicates a malicious interaction with the garment 110 (e.g., a physical assault against the user). During the user-managed scoring mode 406, the clothing sensor module 102 further communicates with the user to eliminate false positives. That is, the clothing sensor module 102 may present the classification of various sensor data samples to the user (e.g., via one of the output devices 270), and the user may notify the clothing sensor module 102 whether the classification was accurate (e.g., via one of the input devices 260). For example, in an illustrative embodiment, a user may wear a shirt 110 having a one or more clothing sensor modules 102 embedded or attached to the shirt 110. During the user-managed scoring mode 406, if the shirt 110 gets caught on a door handle during the normal day activity of the user, the sudden deflection and/or deformation of the shirt 110 may cause the force sensor(s) 230 to generate a sensor data sample that may be classified as malicious. Because the clothing sensor modules 102 is in the user-managed scoring mode 406, the clothing sensor modules 102 may recognize that the collected sensor data should be benign, although it appears to be malicious. As such, to score the malicious sensor data samples as a false positive, the clothing sensor modules 102 may notify the user to confirm that the malicious sensor data is in fact a false positive. Therefore, if the shirt 110 is caught on the door handle again in the future, the assault detection model 330 is now trained to classify that type of interaction as benign. In this way, the false positive rate of the clothing sensor module 102 may be reduced through user-guided opportunistic learning of normal benign interactions. In some embodiments, each classification of the clothing sensor module 102 (i.e., both benign and malicious classifications) made during the user-managed scoring mode 406 may be presented to the user for classification.

Figure 5:
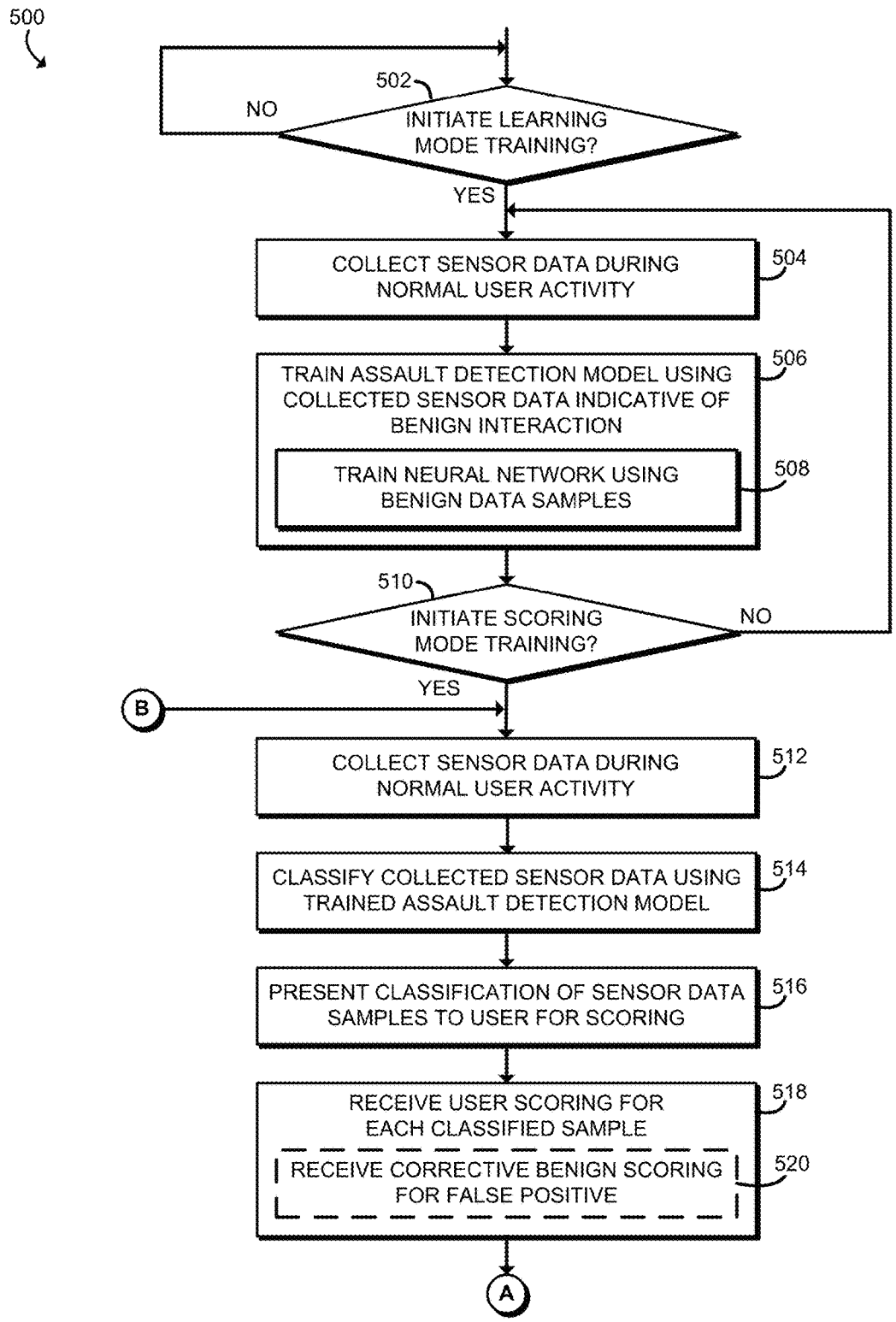
FIGS. 5-6 are a simplified flow diagram of at least one embodiment of a method for training the clothing sensor module of FIGS. 2 and 3.
Figure 6:
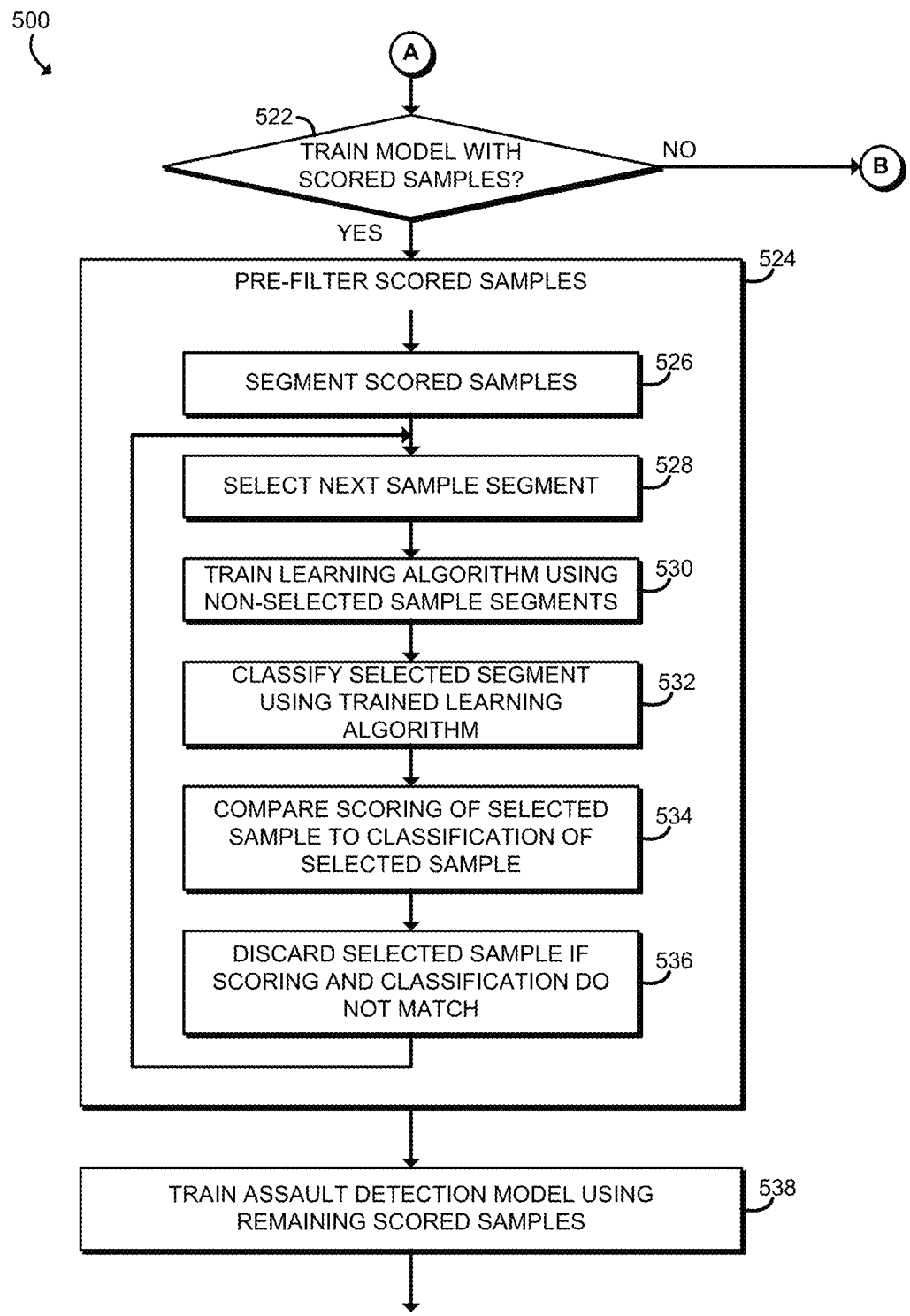

Referring to FIGS. 5-6, in use, each clothing sensor module 102 may execute a method 500 for training an assault detection model of the clothing sensor module 102 to detect a physical assault against a user. As discussed above, the clothing sensor module 102 may be initially trained by the manufacturer or other party and provided to the user as a base assault detection model 402. The method 500 begins with block 502 in which the clothing sensor module 102 determines whether a user-managed learning mode training is initiated. If not, the method 500 remains in block 502 until the learning mode training is initiated by the user. If the clothing sensor module 102 determines that the user-managed learning mode training is initiated, the method 500 advances to block 504. In block 504, the clothing sensor module 102 collects sensor data during normal user activity. That is, the clothing sensor module 102 collects sensor data from the force sensor(s) 230 while the user wears the protected garment 110 during normal daily activity. As discussed above, the sensor data collected during the user-managed learning mode 404 is presumed to be benign data samples. After collecting the sensor data, the method 500 advances to block 506 in which the clothing sensor module 102 trains the assault detection model 330 using the collected sensor data indicative of benign interactions with the garment 110. As discussed in above, the assault detection model 330 is embodied as the neural network 332 in the illustrative embodiment. In such embodiments, the clothing sensor module 102 is configured to train the neural network 332 using the collected benign data samples as an input to the assault detection model 330 in block 508.

After training the assault detection model 330 based on the user's benign activity, the method 500 advances to block 510 in which the clothing sensor module 102 determines whether to initiate the user-managed scoring mode 406 training. If not, the method 500 loops back to block 504 in which the clothing sensor module 102 to continue to collect sensor data during the normal user activity. If, however, the clothing sensor module 102 determines that the user-managed scoring mode 406 training is to begin, the method 500 advances to block 512. In block 512, the clothing sensor module 102 continues to collect additional sensor data during the normal activity of the user while wearing the protected garment 110. After collecting the additional sensor data in block 512, the clothing sensor module 102 advances to blocks 514-520 to eliminate false positive data. Specifically, in block 514, the clothing sensor module 102 classifies each of the sensor data samples of the additional sensor data using the assault detection model 330 as trained in block 506. As discussed above, each sensor data sample may be classified as a benign or a malicious, and the sensor data samples that are collected during the normal activity of the user in block 512 are considered as benign data samples. After classifying each sensor data sample of the collected sensor data, the clothing sensor module 102 presents the sensor data samples to the user for scoring in block 516. For example, if the sensor data sample is classified as malicious, the clothing sensor module 102 presents the malicious sensor data sample to the user to verify that the interaction was in fact benign. Of course, in other embodiments, the clothing sensor module 102 may present each classification to the user for scoring, not just those identified as malicious. In some embodiments, the clothing sensor module 102 may present the classification to the user via a display of the input devices 260 or via communication with the user's personal communication device 204 of the user (e.g., for display on a display of the user's personal communication device 204). After the clothing sensor module 102 has presented the classification to the user, the user may score the classification as benign or malicious. When the user scores a false positive in response to the presentation of the malicious sensor data sample, the clothing sensor module 102 receives the scoring from the user in block 518. For example, in some embodiments, the clothing sensor module 102 may receive a corrective benign scoring for the false positive in block 520.

After receiving the scored sensor data samples from the user, the method 500 advances to block 522 in FIG. 6 in which the clothing sensor module 102 determines whether to train the assault detection model 330 with the scored data samples. If not, the method 500 loops back to block 512 of FIG. 5 to continue with the user-managed scoring mode 406 training. If, however, the clothing sensor module 102 determines to train the assault detection model 330 with the scored data samples, the method 500 advances to block 524. In block 524, the data pre-filter 340 of the clothing sensor module 102 pre-filters the scored data samples to reduce a size of the scored data samples to efficiently process of the sensor data. To do so, the method 500 advances to blocks 526-536. In block 526, the data pre-filter 340 segments the scored data samples into a plurality of sample segments. The particular size of each sample segment may be fixed or depend on particular criteria such as the sensor data, the type of force sensor 230, and/or other criteria. The data pre-filter 340 then selects the next sample segment of the set of sample segments in block 528. For each selected sample segment, the data pre-filter 340 trains a learning algorithm using the corresponding non-selected sample segments as inputs to the learning algorithm in block 530. The learning algorithm may be embodied as any type of suitable learning algorithm such as a linear regression algorithm, a support vector machine, a deep learning algorithm, or other learning algorithm.

After training the learning algorithm, the data pre-filter 340 classifies the selected sample segment using the learning algorithm as either benign or malicious in block 532. The data pre-filter 340 compares the user-managed scoring of the selected sample segment to the classification of the selected sensor data sample in block 534. If the classification of the scoring of the selected sample segment does not match the classification of the selected sample segment, the data pre-filter 340 discards the selected sample segment in block 536. After discarding the selected sample segment, the method 500 loops back to block 528 to continue to pre-filter the next sample segment. After each sample segment has been analyzed as discussed above, the method 500 advances to block 538 in which the assault detection model trainer 306 trains the assault detection model 330 (e.g., the neural network 332) using those selected sample segments that have not been discarded.

Figure 7:
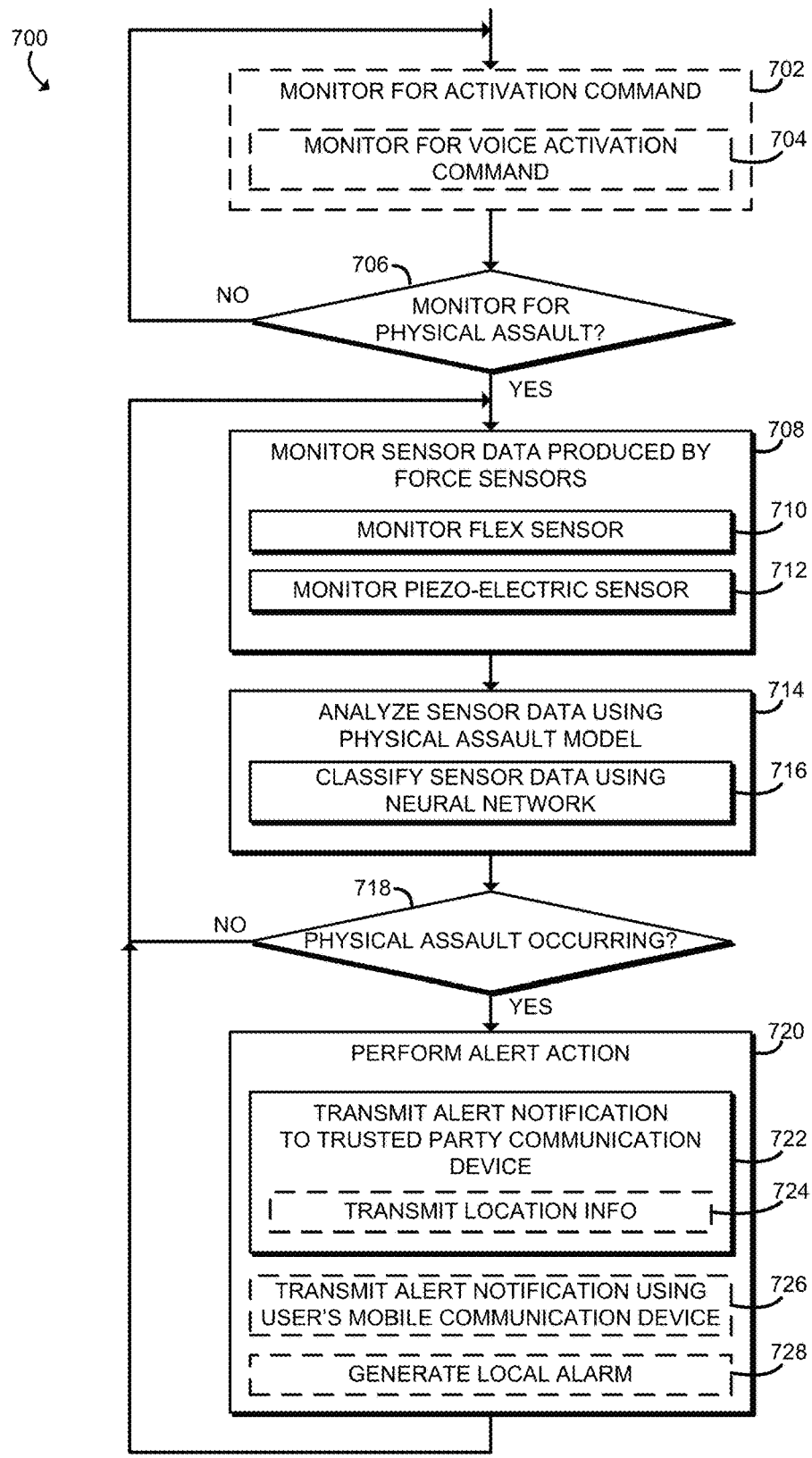
FIG. 7 is a simplified flow diagram of at least one embodiment of a method for detecting a physical assault against a user of the clothing sensor module of FIGS. 2 and 3.

Referring now to FIG. 7, in use, each clothing sensor module 102 may execute a method 700 for detecting a physical assault (e.g., a sexual assault) against the user. The method 700 may begin with block 702 in which the clothing sensor module 102 monitors for an activation command from the user. The activation command may provide an indication that user desires the monitoring of the sensor data received from the force sensor(s) 230. For example, the user may selectively activate or "turn on" the clothing sensor module 102 (e.g., when the user feels in danger). In embodiments in which the input devices 260 include a microphone or other audible input device, the clothing sensor module 102 may monitor for a voice activation command in block 704. It should be appreciated that by activating or turning on only in response to a voice activation command, or other activation command, the rate of false positives of the clothing sensor module 102 may be further reduced.

In block 706, the clothing sensor module 102 whether to monitor for a physical assault. As discussed above, such determination may be based on receipt of an activation command in block 702. Alternatively, in other embodiments, the clothing sensor module 102 may continually monitor for a physical assault or initiate such monitoring based on selection of a corresponding input device 260 (e.g., a user's selection of a an "on" button). If the clothing sensor module 102 determines not to initiate the monitoring for a physical assault against the user, the method 500 loops back to block 702 to continue to monitor for the activation command. If, however, the clothing sensor module 102 determines to monitor for a physical assault against the user, the method 500 advances to block 708. In block 708, the clothing sensor module 102 monitors the sensor data produced by the force sensor(s) 230. For example, in block 710, the clothing sensor module 102 may monitor a flex sensor 232 in block 710 and/or a piezo-electric sensors 234 in block 712. Regardless, after receiving sensor data from one or more force sensors 230, the method 500 advances to block 714 in which the clothing sensor module 102 analyzes the received sensor data using the assault detection model 330. To do so, in the illustrative embodiment, the physical assault detector 304 classifies the sensor data using the neural network 332 in block 716 as discussed above.

After analyzing the sensor data, the method 700 advances to block 718 in which the physical assault detector 304 determines whether a physical assault is presently occurring against the user based on the classification produced by the assault detection model 330 in block 714. If the clothing sensor module 102 determines that a physical assault is not occurring, the method 500 loops back to block 708 to continue to monitor sensor data produced by the force sensor(s) 230. If, however, the clothing sensor module 102 determines that a physical assault is presently occurring against the user, the method 700 advances to block 720. In block 720, the clothing sensor module 102 performs an alert action. The clothing sensor module 102 may perform any type of alert action in block 720. For example, in the illustrative embodiment, the clothing sensor module 102 transmits an alert notification to the trusted third-party communication device 202 in block 724. The alert notification may be embodied as any type of notification (e.g., a text message, an email message, a pre-generated voice call or message, etc.) that is capable of notifying the trusted third-party that a physical assault is presently occurring against the user. In some embodiments, the alert notification may include location information indicative of the location of the clothing sensor module 102 and/or the user. In such embodiments, the location information may be obtained from the location determination circuit 250. In some embodiments, the clothing sensor module 102 may transmit the alert notification using the user's personal communication device 204 in block 726. In such embodiments, the alert notification may include the location information indicative of a location of the user. Such location information may be determined by the clothing sensor module 102 (e.g., via the location determination circuit 250) or by the user's personal communication device 204 (e.g., via a GPS circuit of the personal communication device 204). In some embodiments, the clothing sensor module 102 may additionally or alternatively generate a local alarm in block 728. The local alarm may be embodied as a visual and/or audible alarm may be configured to alert nearby individuals and/or scare away the attacker. Regardless, after performing the alert action, the method 700 loops back to block 708 to continue to monitor sensor data produced by the force sensor(s) 230 to determine whether a physical assault is occurring against the user.

Referring to FIGS. 8-15, simplified graphs illustrating example sensor data results from a force sensor 230 of a pair of shorts 110 during the removal of the shorts 110 are shown. In particular, FIGS. 8, 10, 12, and 14 illustrate example results of a force profile that corresponds to the removal of the shorts 110. Each of FIGS. 8, 12, 12, and 14 includes an illustration at various points on the corresponding graph indicating the positioning of the shorts 110 on the user at that particular point in time. FIGS. 9, 11, 13, and 15 illustrate example results of a voltage profile that corresponds to example sensor data results of the force sensor 230 in FIGS. 8, 10, 12, and 14, respectively. As can be seen in FIGS. 8-14, each pair of example sensor data result has a similar overall trend.

Figure 8:
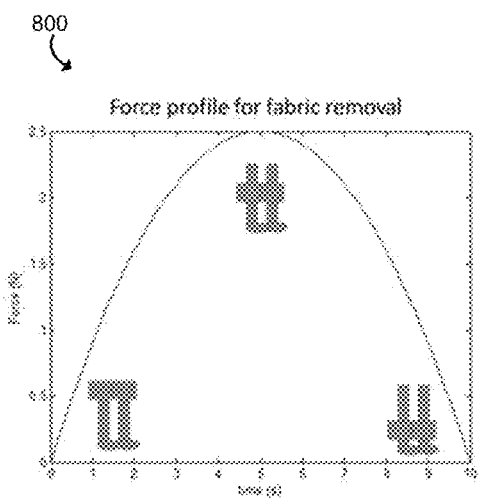
FIGS. 8-15 are simplified graphs of example outputs illustrating example sensor data results during a removal of a secure garment.
Figure 9:
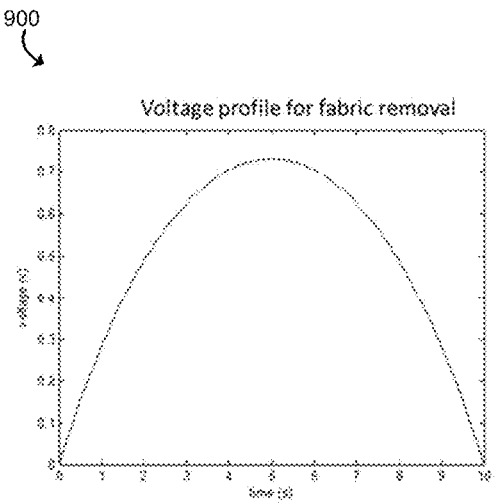
Figure 10:
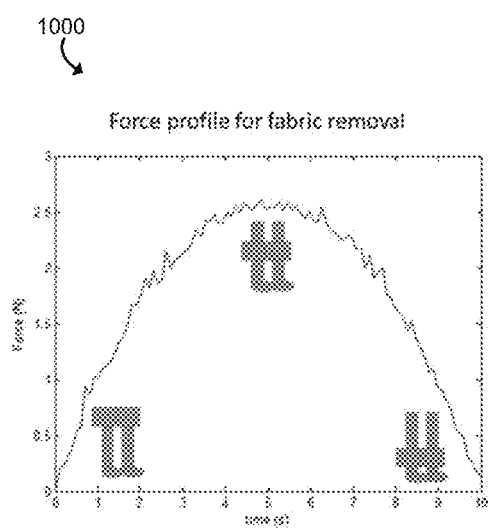
Figure 11:
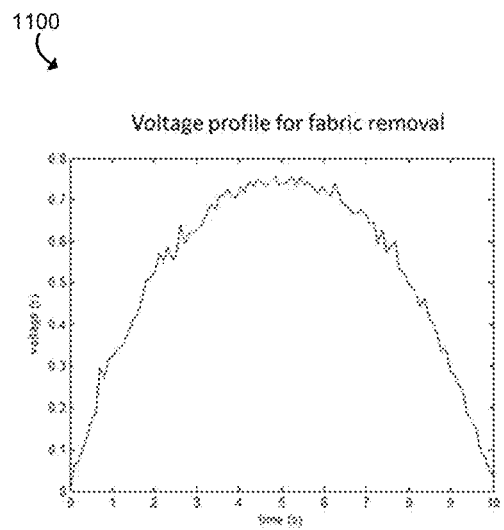
Figure 12:
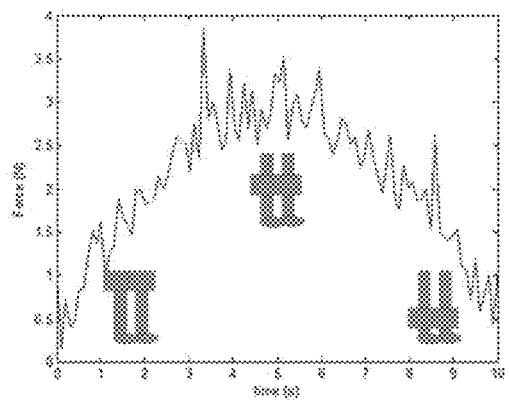
Figure 13:
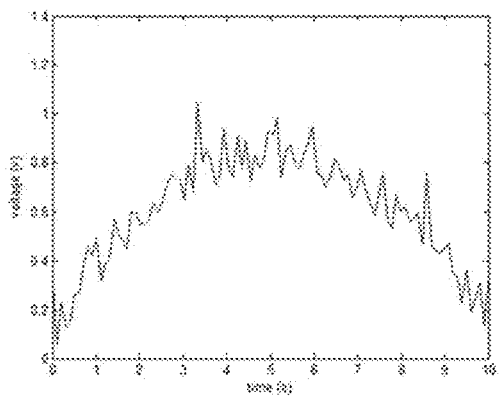
Figure 14:
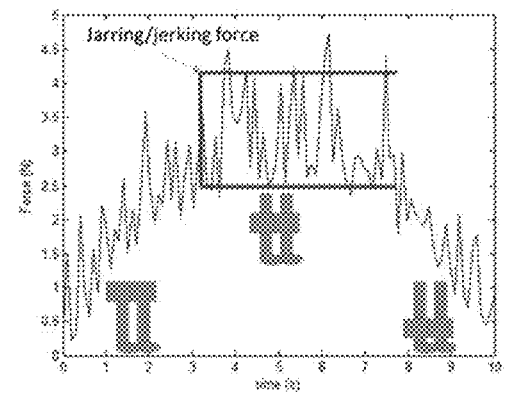
Figure 15:
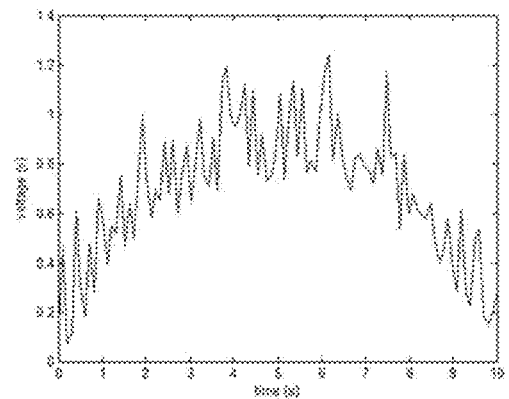

Specifically, FIGS. 8 and 9 show an ideal case of a benign removal of the shorts 110 without any malicious interaction. As shown in FIGS. 8 and 9, graphs 800, 900 illustrate example sensor data of the ideal benign removal of the shorts 110. The graphs 800, 900 form a relatively smooth parabola that opens downwardly. As shown in the graphs 800, 900, the maximum force is measured at a point at which the shorts 110 are midway down the user's legs. As shown in FIGS. 10 and 11, graphs 1000, 1100 illustrate a typical case in which there is some deviation from the ideal benign removal but without any malicious interaction with the shorts 110. As can be seen in FIGS. 10 and 11, the graphs 1000, 1100 are similar to the ideal benign removal graphs 800, 900 with the maximum force detected at a point at which the shorts 110 are midway down the user's legs. As shown in FIGS. 12 and 13, graphs 1200, 1300 illustrate one possible ambiguous case in which the classification between benign and malicious can be more difficult. As can be seen in FIGS. 12 and 13, the maximum force detected is not at the midway point of the removal of the shorts 110. For such cases, a classification error can be high. However, by training the assault detection model 330 with a large number of ambiguous sensor data samples (e.g., via the user-managed scoring mode 406 training), the classification error can be reduced. Lastly, FIGS. 14 and 15 illustrate example sensor data of a clear malicious removal of the shorts 110. As can be seen in FIGS. 14 and 15, graphs 1400, 1500 show a high discrepancy compared to the ideal benign removal shown in graphs 800, 900. Of course, it should be appreciated that the graphs 800, 900, 1000, 1100, 1200, 1300, 1400, and 1500 are merely illustrative examples of sensor data that may be produced by the force sensor(s) 230 of the clothing sensor module 102 during various activities. In other embodiments, the force sensor(s) 230 may produce graphs having different shapes, peaks, and troughs based on the interaction with the shorts 110, the type of force sensors 230 used, and/or other criteria.

EXAMPLES

Illustrative examples of the technologies disclosed herein are provided below. An embodiment of the technologies may include any one or more, and any combination of, the examples described below.

Example 1 includes a clothing sensor module to detect a physical assault against a user. The clothing sensor module comprises a force sensor to produce sensor data indicative of removal of a garment from the user; a physical assault detector to determine whether a physical assault is presently occurring against the user using an assault detection model with the sensor data as an input to the assault detection model; and a physical assault responder to perform an alert action in response to a determination that a physical assault is presently occurring against the user.

Example 2 includes the subject matter of Example 1, and wherein the force sensor is embedded in the garment of the user.

Example 3 includes the subject matter of Example 1 or 2, and wherein the garment is a belt, a shirt, a pair of pants, a skirt, a pair of shorts, or an undergarment.

Example 4 includes the subject matter of any of Examples 1-3, and wherein the force sensor is embedded in a zipper of the garment of the user.

Example 5 includes the subject matter of any of Examples 1-4, and wherein the force sensor is embedded in one or more buttons of the garment of the user.

Example 6 includes the subject matter of any of Examples 1-5, and wherein the force sensor is embedded in the garment at an erogenous zone of the garment of the user.

Example 7 includes the subject matter of any of Examples 1-6, and wherein the force sensor is attachable and detachable to the garment of the user.

Example 8 includes the subject matter of any of Examples 1-7, and wherein the force sensor comprises a flex sensor.

Example 9 includes the subject matter of any of Examples 1-8, and wherein the force sensor comprises a piezo-electric sensor.

Example 10 includes the subject matter of any of Examples 1-9, and wherein to determine whether a physical assault is presently occurring against the user comprises to determine whether a physical assault is presently occurring against the user using a neural network with the sensor data as an input to the neural network.

Example 11 includes the subject matter of any of Examples 1-10, and wherein to perform the alert action comprises to transmit an alert notification to a trusted third-party communication device.

Example 12 includes the subject matter of any of Examples 1-11, and wherein to transmit the alert notification to a trusted third-party communication device comprises to transmit the alert notification to a mobile communication device of the user; and transmit, via the mobile communication device of the user, the alert notification to the trusted third-party communication device.

Example 13 includes the subject matter of any of Examples 1-12, and wherein the physical assault responder includes an output manager to generate a local alert in response to the determination that a physical assault is presently occurring against the user.

Example 14 includes the subject matter of any of Examples 1-13, and wherein the local alert comprises an audible or visual alert.

Example 15 includes the subject matter of any of Examples 1-14, and wherein the physical assault responder includes an activator to monitor for an activation command from the user, wherein to determine whether the physical assault is presently occurring against the user comprises to determine whether a physical assault is presently occurring against the user in response to receipt of the activation command.

Example 16 includes the subject matter of any of Examples 1-15, and wherein the activator comprises a microphone to monitor for a voice activation command from the user.

Example 17 includes the subject matter of any of Examples 1-16, and wherein to determine whether a physical assault is presently occurring against the user comprises to determine whether a physical assault is presently occurring against the user using a neural network with the sensor data as an input to the neural network.

Example 18 includes the subject matter of any of Examples 1-17, and further comprising an assault detection model trainer to perform a first user-managed training of the neural network, wherein to perform the first user-managed training comprises to collect benign data samples of the sensor data produced by the force sensor during normal activity of the user while wearing the garment, wherein the benign data samples are indicative of a benign interaction with the garment; and train the neural network using the benign data samples.

Example 19 includes the subject matter of any of Examples 1-18, and wherein the assault detection model trainer is further to perform a second user-managed training of the neural network, wherein to perform the second user-managed training comprises to collect additional data samples of the sensor data produced by the force sensor during normal activity of the user while wearing the garment; classify the additional data samples as benign or malicious; present the classification of each additional data sample to the user for scoring; receive a score selected by the user for the classification of each data sample, wherein the score indicates whether the additional data sample is benign or malicious; and train the neural network using the scored data samples.

Example 20 includes the subject matter of any of Examples 1-19, and wherein to train the neural network using the scored data samples comprises to segment the scored data samples into a plurality of sample segments; select each sample segment of the plurality of sample segments; train, for each selected sample segment, a learning algorithm using the corresponding non-selected sample segments as inputs to the learning algorithm; classify the selected sample segment using the learning algorithm as either benign or malicious; discard the selected sample segment if the classification and the score of the selected sample segment does not match the classification of the selected sample segment; and train the neural network using those selected sample segments that have not been discarded.

Example 21 includes a method for detecting a physical assault against a user. The method includes producing, by a force sensor of a clothing sensor module coupled to a garment of the user, sensor data indicative of the removal of the garment from the user; determining, by the clothing sensor module, whether a physical assault is presently occurring against the user using an assault detection model with the sensor data as an input to the assault detection model; and performing, by the clothing sensor module, an alert action in response to a determination that a physical assault is presently occurring against the user.

Example 22 includes the subject matter of Example 21, and wherein producing the sensor data indicative of the removal of the garment from the user comprises producing, by a force sensor embedded in the garment of the user, sensor data indicative of the removal of the garment from the user.

Example 23 includes the subject matter of Example 21 or 22, and wherein producing the sensor data indicative of the removal of the garment from the user comprises producing, by a force sensor attachable and detachable to the garment of the user, sensor data indicative of the removal of the garment from the user.

Example 24 includes the subject matter of any of Examples 21-23, and wherein producing the sensor data indicative of the removal of the garment from the user comprises producing, by a flex sensor of the clothing sensor module coupled to the garment of the user, sensor data indicative of the removal of the garment from the user.

Example 25 includes the subject matter of any of Examples 21-24, and wherein producing the sensor data indicative of the removal of the garment from the user comprises producing, by a piezo-electric sensor of the clothing sensor module coupled to the garment of the user, sensor data indicative of the removal of the garment from the user.

Example 26 includes the subject matter of any of Examples 21-25, and wherein determining whether a physical assault is presently occurring against the user comprises determining whether a physical assault is presently occurring against the user using a neural network with the sensor data as an input to the neural network.

Example 27 includes the subject matter of any of Examples 21-26, and wherein performing the alert action comprises transmitting an alert notification to a trusted third-party communication device.

Example 28 includes the subject matter of any of Examples 21-27, and wherein transmitting the alert notification to a trusted third-party communication device comprises transmitting the alert notification to a mobile communication device of the user; and transmitting, via the mobile communication device of the user, the alert notification to the trusted third-party communication device.

Example 29 includes the subject matter of any of Examples 21-28, and wherein performing the alert action comprises activating an output device of the clothing sensor module to generate a local alert.

Example 30 includes the subject matter of any of Examples 21-29, and wherein activating the output device comprises generating an audible or visual alert.

Example 31 includes the subject matter of any of Examples 21-30, and further comprising monitoring, by the clothing sensor module, for an activation command from the user, wherein determining whether the physical assault is presently occurring against the user comprises determining whether a physical assault is presently occurring against the user in response to receipt of the activation command.

Example 32 includes the subject matter of any of Examples 21-31, and wherein monitoring for the activation command comprises monitoring, via a microphone of the clothing sensor module, for a voice activation command from the user.

Example 33 includes the subject matter of any of Examples 21-32, and wherein determining whether a physical assault is presently occurring against the user comprises determining whether a physical assault is presently occurring against the user using a neural network with the sensor data as an input to the neural network, and further comprising performing a first user-managed training of the neural network, wherein performing the first user-managed training comprises collecting, by the clothing sensor module, benign data samples of the sensor data produced by the force sensor during normal activity of the user while wearing the garment, wherein the benign data samples are indicative of a benign interaction with the garment; and training, by the clothing sensor module, the neural network using the benign data samples.

Example 34 includes the subject matter of any of Examples 21-33, and further comprising performing a second user-managed training of the neural network, wherein performing the second user-managed training comprises collecting, by the clothing sensor module, additional data samples of the sensor data produced by the force sensor during normal activity of the user while wearing the garment; classifying, by the neural network, the additional data samples as benign or malicious; presenting, by the clothing sensor module, the classification of each additional data sample to the user for scoring; receiving, by the clothing sensor module, a score selected by the user for the classification of each data sample, wherein the score indicates whether the additional data sample is benign or malicious; and training, by the clothing sensor module, the neural network using the scored data samples.

Example 35 includes the subject matter of any of Examples 21-34, and wherein training the neural network using the scored data samples comprises segmenting the scored data samples into a plurality of sample segments; selecting each sample segment of the plurality of sample segments; training, for each selected sample segment, a learning algorithm using the corresponding non-selected sample segments as inputs to the learning algorithm; classifying the selected sample segment using the learning algorithm as either benign or malicious; discarding the selected sample segment if the classification and the score of the selected sample segment does not match the classification of the selected sample segment; and training the neural network using those selected sample segments that have not been discarded.

Example 36 includes one or more machine-readable storage media comprising a plurality of instructions stored thereon that, when executed, causes a clothing sensor module to perform the method of any of Examples 21-35.

Example 37 includes a clothing sensor module to detect a physical assault against a user. The clothing sensor module includes means for producing sensor data indicative of the removal of the garment from the user; means for determining whether a physical assault is presently occurring against the user using an assault detection model with the sensor data as an input to the assault detection model; and means for performing an alert action in response to a determination that a physical assault is presently occurring against the user.

Example 38 includes the subject matter of Example 37, and wherein the means for producing the sensor data indicative of the removal of the garment from the user comprises a force sensor embedded in the garment of the user.

Example 39 includes the subject matter of Example 37 or 38, and wherein the means for producing the sensor data indicative of the removal of the garment from the user comprises a force sensor attachable and detachable to the garment of the user.

Example 40 includes the subject matter of any of Examples 37-39, and wherein the means for producing the sensor data indicative of the removal of the garment from the user comprises a flex sensor of the clothing sensor module coupled to the garment of the user.

Example 41 includes the subject matter of any of Examples 37-40, and wherein the means for producing the sensor data indicative of the removal of the garment from the user comprises a piezo-electric sensor of the clothing sensor module coupled to the garment of the user.

Example 42 includes the subject matter of any of Examples 37-41, and wherein the means for determining whether a physical assault is presently occurring against the user comprises means for determining whether a physical assault is presently occurring against the user using a neural network with the sensor data as an input to the neural network.

Example 43 includes the subject matter of any of Examples 37-42, and wherein the means for performing the alert action comprises means for transmitting an alert notification to a trusted third-party communication device.

Example 44 includes the subject matter of any of Examples 37-43, and wherein the means for transmitting the alert notification to a trusted third-party communication device comprises means for transmitting the alert notification to a mobile communication device of the user; and means for transmitting the alert notification from the mobile communication device to the trusted third-party communication device.

Example 45 includes the subject matter of any of Examples 37-44, and wherein the means for performing the alert action comprises means for activating an output device of the clothing sensor module to generate a local alert.

Example 46 includes the subject matter of any of Examples 37-45, and wherein the means for activating the output device comprises activating generating an audible or visual alert.

Example 47 includes the subject matter of any of Examples 37-46, and further comprising means for monitoring for an activation command from the user, wherein means for determining whether the physical assault is presently occurring against the user comprises means for determining whether a physical assault is presently occurring against the user in response to receipt of the activation command.

Example 48 includes the subject matter of any of Examples 37-47, and wherein the means for monitoring for the activation command comprises means for monitoring for a voice activation command from the user.

Example 49 includes the subject matter of any of Examples 37-48, and wherein the means for determining whether a physical assault is presently occurring against the user comprises means for determining whether a physical assault is presently occurring against the user using a neural network with the sensor data as an input to the neural network, and further comprising means for performing a first user-managed training of the neural network, wherein the means for performing the first user-managed training comprises means for collecting benign data samples of the sensor data produced by the force sensor during normal activity of the user while wearing the garment, wherein the benign data samples are indicative of a benign interaction with the garment; and means for training the neural network using the benign data samples.

Example 50 includes the subject matter of any of Examples 37-49, and further comprising means for performing a second user-managed training of the neural network, wherein the means for performing the second user-managed training comprises means for collecting additional data samples of the sensor data produced by the force sensor during normal activity of the user while wearing the garment; means for classifying the additional data samples as benign or malicious using the neural network; means for presenting the classification of each additional data sample to the user for scoring; means for receiving a score selected by the user for the classification of each data sample, wherein the score indicates whether the additional data sample is benign or malicious; and means for training the neural network using the scored data samples.

Example 51 includes the subject matter of any of Examples 37-50, and wherein the means for training the neural network using the scored data samples comprises means for segmenting the scored data samples into a plurality of sample segments; means for selecting each sample segment of the plurality of sample segments; means for training, for each selected sample segment, a learning algorithm using the corresponding non-selected sample segments as inputs to the learning algorithm; means for classifying the selected sample segment using the learning algorithm as either benign or malicious; means for discarding the selected sample segment if the classification and the score of the selected sample segment does not match the classification of the selected sample segment; and means for training the neural network using those selected sample segments that have not been discarded.

The invention claimed is:

1. A clothing sensor module to detect physical assaults against a user, the clothing sensor module comprising:
   a force sensor to produce sensor data indicative of removal of a garment from the user;
   a physical assault detector to determine whether a physical assault is presently occurring against the user using an assault detection model with the sensor data as an input to the assault detection model, wherein the assault detection model comprises a mathematical model personalized to the user to produce an output indicative of whether the garment is being removed from the user without the user's consent based on the input of the sensor data; and
   a physical assault responder comprising an audio analyzer to monitor for an activation voice command from the user, wherein the physical assault responder is to perform, in response to (i) receipt of the activation voice command and (ii) a determination that the physical assault is presently occurring against the user, an alert action, wherein to perform the alert action comprises to capture of audio, still images, or video images of an environment in which the user is located or an attacker of the user.

2. The clothing sensor module of claim 1, wherein the force sensor is embedded in the garment of the user at an erogenous zone of the garment of the user.

3. The clothing sensor module of claim 1, wherein the force sensor is attachable and detachable to the garment of the user.

4. The clothing sensor module of claim 1, wherein to perform the alert action comprises to transmit an alert notification to a trusted third-party communication device.

5. The clothing sensor module of claim 1, wherein to determine whether the physical assault is presently occurring against the user comprises to determine whether the physical assault is presently occurring against the user using a neural network with the sensor data as an input to the neural network.

6. The clothing sensor module of claim 5, further comprising an assault detection model trainer to perform a first user-managed training of the neural network, wherein to perform the first user-managed training comprises to:
   collect benign data samples of the sensor data produced by the force sensor during normal activity of the user while wearing the garment, wherein the benign data samples are indicative of a benign interaction with the garment; and
   train the neural network using the benign data samples.

7. The clothing sensor module of claim 6, wherein the assault detection model trainer is further configured to perform a second user-managed training of the neural network, wherein to perform the second user-managed training comprises to:
   collect additional data samples of the sensor data produced by the force sensor during normal activity of the user while wearing the garment;
   classify the additional data samples as benign or malicious;
   present the classification of each additional data sample to the user for scoring;
   receive a score selected by the user for the classification of each data sample, wherein the score indicates whether the additional data sample is benign or malicious; and
   train the neural network using the scored data samples.

8. The clothing sensor module of claim 7, wherein to train the neural network using the scored data samples comprises to:
   segment the scored data samples into a plurality of sample segments;
   select each sample segment of the plurality of sample segments;
   train, for each selected sample segment, a learning algorithm using a corresponding non-selected sample segments as inputs to the learning algorithm;
   classify the selected sample segment using the learning algorithm as either benign or malicious;

discard the selected sample segment if the classification and the score of the selected sample segment does not match the classification of the selected sample segment; and train the neural network using those selected sample segments that have not been discarded.

9. A method for detecting physical assaults against a user, the method comprising:

producing, by a force sensor of a clothing sensor module coupled to a garment of the user, sensor data indicative of the removal of the garment from the user;

monitoring, by the clothing sensor module, for an activation command from the user;

determining, by the clothing sensor module, whether a physical assault is presently occurring against the user using an assault detection model with the sensor data as an input to the assault detection model, wherein the assault detection model comprises a mathematical model personalized to the user to produce an output indicative of whether the garment is being removed from the user without the user's consent based on the input of the sensor data;

monitoring, by an audio analyzer of the clothing sensor module, for an activation voice command from the user; and performing, by the clothing sensor module, an alert action in response to (i) receipt of the activation voice command and (ii) a determination that the physical assault is presently occurring against the user, wherein performing the alert action comprises capturing of audio, still images, or video images of an environment in which the user is located or an attacker of the user.

10. The method of claim 9, wherein producing the sensor data indicative of the removal of the garment from the user comprises producing, by the force sensor embedded in the garment of the user, sensor data indicative of the removal of the garment from the user.

11. The method of claim 9, wherein producing the sensor data indicative of the removal of the garment from the user comprises producing, by the force sensor attachable and detachable to the garment of the user, sensor data indicative of the removal of the garment from the user.

12. The method of claim 9, wherein determining whether the physical assault is presently occurring against the user comprises determining whether the physical assault is presently occurring against the user using a neural network with the sensor data as an input to the neural network.

13. The method of claim 9, wherein determining whether the physical assault is presently occurring against the user comprises determining whether the physical assault is presently occurring against the user using a neural network with the sensor data as an input to the neural network, and further comprising performing a first user-managed training of the neural network, wherein performing the first user-managed training comprises:

collecting, by the clothing sensor module, benign data samples of the sensor data produced by the force sensor during normal activity of the user while wearing the garment, wherein the benign data samples are indicative of a benign interaction with the garment; and training, by the clothing sensor module, the neural network using the benign data samples.

14. The method of claim 13, further comprising performing a second user-managed training of the neural network, wherein performing the second user-managed training comprises:

collecting, by the clothing sensor module, additional data samples of the sensor data produced by the force sensor during normal activity of the user while wearing the garment;

classifying, by the neural network, the additional data samples as benign or malicious;

presenting, by the clothing sensor module, the classification of each additional data sample to the user for scoring;

receiving, by the clothing sensor module, a score selected by the user for the classification of each data sample, wherein the score indicates whether the additional data sample is benign or malicious; and training, by the clothing sensor module, the neural network using the scored data samples.

15. The method of claim 14, wherein training the neural network using the scored data samples comprises:

segmenting the scored data samples into a plurality of sample segments;

selecting each sample segment of the plurality of sample segments;

training, for each selected sample segment, a learning algorithm using a corresponding non-selected sample segments as inputs to the learning algorithm;

classifying the selected sample segment using the learning algorithm as either benign or malicious;

discarding the selected sample segment if the classification and the score of the selected sample segment does not match the classification of the selected sample segment; and training the neural network using those selected sample segments that have not been discarded.

16. One or more non-transitory, machine-readable storage media comprising a plurality of instructions stored thereon that, when executed, cause a clothing sensor module to:

receive, from a force sensor of a clothing sensor module coupled to a garment of the user, sensor data indicative of the removal of the garment from the user;

monitor, for an activation command from the user;

determine, whether a physical assault is presently occurring against the user using an assault detection model with the sensor data as an input to the assault detection model, wherein the assault detection model comprises a mathematical model personalized to the user to produce an output indicative of whether the garment is being removed from the user without the user's consent based on the input of the sensor data;

monitor for an activation voice command from the user; and perform, an alert action in response to (i) receipt of the activation voice command and (ii) a determination that the physical assault is presently occurring against the user, wherein to perform the alert action comprises to capture of audio, still images, or video images of an environment in which the user is located or an attacker of the user.

17. The one or more non-transitory, machine-readable storage media of claim 16, wherein to receive the sensor data indicative of the removal of the garment from the user comprises to receive, from the force sensor embedded in the garment of the user, sensor data indicative of the removal of the garment from the user.

18. The one or more non-transitory, machine-readable storage media of claim 16, wherein to receive the sensor data indicative of the removal of the garment from the user comprises to receive, by the force sensor attachable and detachable to the garment of the user, sensor data indicative of the removal of the garment from the user.

19. The one or more non-transitory, machine-readable storage media of claim 16, wherein to determine whether the physical assault is presently occurring against the user comprises to determine whether the physical assault is presently occurring against the user using a neural network with the sensor data as an input to the neural network.

20. The one or more non-transitory, machine-readable storage media of claim 16, wherein to determine whether the physical assault is presently occurring against the user comprises to determine whether a physical assault is presently occurring against the user using a neural network with the sensor data as an input to the neural network, and
wherein the plurality of instructions, when executed, further cause the clothing sensor module to perform a first user-managed training of the neural network, wherein to perform the first user-managed training comprises to:
collect benign data samples of the sensor data produced by the force sensor during normal activity of the user while wearing the garment, wherein the benign data samples are indicative of a benign interaction with the garment; and
train the neural network using the benign data samples.

21. The one or more non-transitory, machine-readable storage media of claim 20, wherein the plurality of instructions, when executed, further cause the clothing sensor module to perform a second user-managed training of the neural network, wherein to perform the second user-managed training comprises to:
collect additional data samples of the sensor data produced by the force sensor during normal activity of the user while wearing the garment;
classify, by the neural network, the additional data samples as benign or malicious;
present the classification of each additional data sample to the user for scoring;
receive a score selected by the user for the classification of each data sample, wherein the score indicates whether the additional data sample is benign or malicious; and
train the neural network using the scored data samples.

22. The one or more non-transitory, machine-readable storage media of claim 21, wherein to train the neural network using the scored data samples comprises to:
segment the scored data samples into a plurality of sample segments;
select each sample segment of the plurality of sample segments;
train, for each selected sample segment, a learning algorithm using a corresponding non-selected sample segments as inputs to the learning algorithm;
classify the selected sample segment using the learning algorithm as either benign or malicious;
discard the selected sample segment if the classification and the score of the selected sample segment does not match the classification of the selected sample segment; and
train the neural network using those selected sample segments that have not been discarded.

* * * * *